(12) United States Patent
Vogt et al.

(10) Patent No.: US 10,474,123 B2
(45) Date of Patent: Nov. 12, 2019

(54) METHOD AND APPARATUS FOR DETECTING AND CORRECTING A SPATIAL POSITION OF A WORKPIECE HELD IN A POSITIONING DEVICE

(71) Applicant: JENOPTIK Automatisierungstechnik GmbH, Jena (DE)

(72) Inventors: Stefan Vogt, Jena (DE); Thomas Doering, Sulza (DE); Pierre Geipel, Braunichswalde (DE); Robert Michel-Triller, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 420 days.

(21) Appl. No.: 15/033,761

(22) PCT Filed: Oct. 28, 2014

(86) PCT No.: PCT/EP2014/002895
§ 371 (c)(1),
(2) Date: May 2, 2016

(87) PCT Pub. No.: WO2015/062717
PCT Pub. Date: May 7, 2015

(65) Prior Publication Data
US 2016/0259318 A1      Sep. 8, 2016

(30) Foreign Application Priority Data
Oct. 30, 2013    (DE) .................. 10 2013 018 654

(51) Int. Cl.
*G05B 19/402*    (2006.01)
*B23Q 15/22*    (2006.01)
(Continued)

(52) U.S. Cl.
CPC .......... *G05B 19/402* (2013.01); *B23Q 15/22* (2013.01); *B23Q 17/2428* (2013.01);
(Continued)

(58) Field of Classification Search
CPC .... G05B 19/402; G05B 15/02; G05B 19/401; G05B 2219/37618; G05B 2219/50052;
(Continued)

(56) References Cited

U.S. PATENT DOCUMENTS 3,740,160 A * 6/1973 Kimura .................. B23B 39/08
                                                      408/13
3,943,746 A * 3/1976 Eitel ........................ B21D 3/10
                                                      72/16.4
(Continued)

FOREIGN PATENT DOCUMENTS

DE        101 39 081 A1    2/2003
DE        10139081 A1 *    2/2003   ............. B23Q 15/22
(Continued)

*Primary Examiner* — Bitew A Dinke
(74) *Attorney, Agent, or Firm* — Muncy, Geissler, Olds & Lowe, P.C.

(57) ABSTRACT

A method and an apparatus for detecting and correcting a spatial position of a workpiece held in a positioning device, wherein a machining head having at least one sensor and position sensor is fed into at least one measuring position. Contactless sensing of an actual position of a measuring point of the workpiece is carried out at the measuring position using the machining head and the sensed actual position is compared with an expected nominal position and deviation values between the actual position and the nominal position are ascertained. The ascertained deviation values are compared with an admissible tolerance value and the machining head is fed to a contour when the ascertained deviation is within the admissible tolerance value, or the machining head and the workpiece are oriented with respect (Continued)

to one another and to the contour such that a deviation of the actual position is within the admissible tolerance values following orientation.

12 Claims, 5 Drawing Sheets

(51) Int. Cl.
　　*G05B 19/401* (2006.01)
　　*B23Q 17/24* (2006.01)
　　*G05B 15/02* (2006.01)
(52) U.S. Cl.
　　CPC .......... *G05B 15/02* (2013.01); *G05B 19/401* (2013.01); *G05B 2219/37002* (2013.01); *G05B 2219/37027* (2013.01); *G05B 2219/37379* (2013.01); *G05B 2219/37593* (2013.01); *G05B 2219/37618* (2013.01); *G05B 2219/49112* (2013.01); *G05B 2219/50052* (2013.01)
(58) Field of Classification Search
　　CPC .......... G05B 2219/37379; G05B 2219/37027; G05B 2219/37002; G05B 2219/49112; G05B 2219/37593; B23Q 17/2428; B23Q 15/22
　　See application file for complete search history.

(56) References Cited

U.S. PATENT DOCUMENTS

| | | | |
|---|---|---|---|
| 4,942,611 A | 7/1990 | Kunugi et al. | |
| 5,274,566 A * | 12/1993 | Reed | G01B 17/00 700/195 |
| 5,357,450 A * | 10/1994 | Hemmerle | G05B 19/4015 700/176 |
| 5,672,092 A | 9/1997 | Berberich | |
| 5,685,999 A * | 11/1997 | Wiedemann | B23K 26/032 219/121.78 |
| 5,901,595 A * | 5/1999 | Massee | G05B 19/401 72/81 |
| 5,920,483 A * | 7/1999 | Greenwood | G05B 19/401 409/132 |
| 6,325,697 B1 * | 12/2001 | Gottschalk | B24B 9/148 451/11 |
| 2013/0313235 A1 * | 11/2013 | Wadehn | B23K 26/032 219/121.67 |
| 2014/0025191 A1 * | 1/2014 | Wadehn | B23K 26/048 700/166 |
| 2015/0049186 A1 * | 2/2015 | Pettersson | G01B 21/047 348/135 |
| 2015/0231737 A1 * | 8/2015 | Vogt | B23K 26/0884 219/121.72 |
| 2016/0040987 A1 * | 2/2016 | Bernhardt | G01B 21/04 33/503 |
| 2016/0158884 A1 * | 6/2016 | Hagenlocher | B23K 26/0884 219/121.85 |
| 2016/0195389 A1 * | 7/2016 | Sagemueller | G01B 21/045 33/503 |
| 2016/0259318 A1 * | 9/2016 | Vogt | B23Q 15/22 |
| 2017/0328708 A1 * | 11/2017 | Garvey | G01B 21/04 |

FOREIGN PATENT DOCUMENTS

| | | |
|---|---|---|
| DE | 10 2009 026 484 A1 | 12/2010 |
| DE | 10 2011 006 447 A1 | 10/2012 |
| DE | 10 2012 109 245 B3 | 11/2013 |
| EP | 0 545 655 A2 | 6/1993 |

* cited by examiner

METHOD AND APPARATUS FOR DETECTING AND CORRECTING A SPATIAL POSITION OF A WORKPIECE HELD IN A POSITIONING DEVICE

This nonprovisional application is a National Stage of International Application No. PCT/EP2014/002895, which was filed on Oct. 28, 2014, and which claims priority to German Patent Application No. 10 2013 018 654.4, which was filed in Germany on Oct. 30, 2013, and which are both herein incorporated by reference.

BACKGROUND OF THE INVENTION

Field of the Invention

The invention relates to a method and an apparatus for detecting and correcting a spatial position of a workpiece held in a positioning device.

Description of the Background Art

Various methods for correcting the position of workpieces to be machined are known. For example, a method for setting the position of a tool by a drive system is disclosed in DE 101 39 081 A1. In order to achieve a correction of deviations between a momentary position value and an actual position value of a tool that do not actually coincide with the aimed-for target position value on account of required computing times of a control device and other events that have a delaying effect, the setting of the position of the tool is performed exclusively by the evaluation of data that are provided by a sensor device.

DE 10 2009 026 484 A1 relates to an apparatus and a method for machining workpieces. The object of DE 10 2009 026 484 A1 is based on the problem that relatively large apparatuses (machining apparatuses), such as turning or milling machines, in particular first have to reach a certain operating temperature in order for the infeeding paths and relative positions that are provided in the structural design to be precisely correct. For this purpose, it is envisaged to sense a difference occurring between desired and actual positions by means of a sensor. The sensor may in this case be arranged on a holding device or on a machining head. The actual distance is sensed between the holding device and the machining head and is compared with a desired distance. In dependence on the amount of a difference formed between the desired distance and the actual distance, control of the machining of the workpiece is subsequently possible.

The disclosure of DE 10 2011 006 447 A1 then relates to a method for machining structurally identical workpieces by means of an apparatus in which, for the machining, tools are guided along actual tool paths. These actual tool paths are based on known desired tool paths, which in turn represent expected tool paths. During a performed machining of the workpiece, distance values between the desired tool path and the workpiece are continuously measured by means of a sensor. On the basis of these distance values, an actual tool path of the tool is determined and its path deviation from the desired tool path is ascertained. The path deviation is determined and it is checked whether it lies within admissible tolerance values. The desired tool path is corrected on the basis of the distance values and the corrected desired tool path is possibly used as a basis for controlling the tool for subsequently machined workpieces. In principle, in a method according to DE 10 2011 006 447 A1 it is assumed that the workpiece is located at a correct position and the workpiece has at most production-related tolerances. An actual spatial position of the workpiece is not determined.

To be mentioned as the closest prior art is the applicant's as yet unpublished application DE 10 2012 109 245, in which a method and an apparatus for machining non-rotationally symmetrical workpieces by means of laser radiation are described. The disclosed apparatus comprises an infeeding device for infeeding the workpieces to a first machining position and with a machining device having at least one machining head for the machining of a workpiece infed to the first machining position. The infeeding device is a gripping robot with a gripping device. Arranged in the range of its grasp is a providing device with holders, the design and dimensioning of which is chosen such that at least one workpiece held in the holders is provided, with a defined spatial alignment and position of the infeeding device for being removed from the holders. At least one clamping device is also arranged, for receiving a workpiece infed by the infeeding device, a machining position being respectively defined by each clamping device. The clamping device and the infeeding device may also be regarded as a positioning device, since the workpiece is positioned by the interaction of the two. The machining head can be infed to each machining position for the machining of the workpiece.

The solution disclosed in the aforementioned DE 10 2012 109 245 ensures that the workpieces are theoretically infed (positioned in relation) to the machining apparatus in an exact spatial position. The machining apparatus starts the machining with pre-programmed contours, which the laser beam machines on the workpiece.

A pre-requisite for this solution from DE 10 2012 109 245 to work is that workpieces are within a prescribed tolerance range. In particular for the machining of curved workpieces, it is essential that they do not exceed the predefined tolerances in their geometrical dimensions. The workpieces and the machining head are infed to the machining positions with a tolerance of less than 0.1 mm.

It cannot be ensured in industrial practice that the tolerance ranges of the workpieces can be kept so small that the very small tolerance values are maintained during the infeeding of the workpieces and the machining head to a machining position. Sources of error for dimensional deviations are especially the radii of curvature of the workpieces. Such workpieces are often produced by bending a semifinished product, for example a pipe. The material stresses thereby produced in the workpiece may, for example when acting together with effects of the ambient temperatures on the material, lead to an unpredictable deformation of the workpiece. Even small deviations, for example in the radii of curvature, lead to local displacements in the position of the workpiece that considerably impair or completely prevent the machining result. A further problem is the risk of a collision between the machining head and the workpiece, whereby the machining apparatus may be maladjusted or even destroyed.

However, an elaborate measurement of each workpiece would slow down the production sequence considerably. Therefore, a solution that prevents a collision, improves the quality of the machining and can be integrated in the machining process is sought. It is also intended for it to be checked retrospectively whether the machining process has been successfully completed.

SUMMARY OF THE INVENTION

The invention is therefore based on the object of proposing a further possibility by means of which a spatial position of a workpiece held and positioned in a positioning device can be ascertained and if need be corrected.

The object is achieved in a method for detecting and correcting a spatial position of a workpiece held in a positioning device that has the following steps A to G:

A: positioning the workpiece in the positioning device,

B: infeeding a machining head having at least one sensor for distance measurement and position sensing means for sensing the current position of the machining head to at least one measuring position, C: contactlessly sensing an actual position of in each case at least one measuring point of the positioned workpiece at at least two measuring positions by using the machining head, the at least two measuring points lying on a virtual measuring axis which runs on a surface of the workpiece, and determining from the sensed actual positions an angular position of the virtual measuring axis with respect to a virtual reference axis, D: comparing the sensed actual position with an expected desired position and ascertaining deviation values between the actual position and the desired position, E: comparing the ascertained deviation values with an admissible tolerance value, the ascertained deviations being the deviations of the distance values between the actual position and the desired position and the angular position, F: infeeding the machining head to a contour along which the workpiece is to be machined by the machining head whenever the ascertained deviation lies within the admissible tolerance value, or G: aligning the machining head and the workpiece in relation to one another and in relation to the one contour in such a way that after the alignment a deviation of the actual position lies within the admissible tolerance values.

The essence of the invention is to sense a spatial position of the workpiece already before the beginning of a machining of the workpiece. The knowledge of an individual spatial position, as a three-dimensional position, for a respective workpiece allows for example an efficient execution of the machining processes, since a path along which the machining head is to be moved during the machining process can already be precalculated and the number of control measurements can be reduced.

In this description, materials that are generally to be machined, for example raw materials such as metal sheets, pipes or profiles, as well as semifinished products and finished products, are understood as workpieces.

A measuring position is a spatial position of the machining head from which a workpiece can be sensed. The measuring position is reached when the machining head is away from the workpiece at most by such an amount that a distance between the machining head and the workpiece can be sensed within the sensor-related tolerances.

Means for sensing the spatial position (position sensing means) are for example sensors by which a momentary alignment of the machining head is sensed. Thus, the infeeding movements of the machining head that are carried out and stored can serve for determining a current spatial position (current position) of the machining head. A spatial position may also be sensed by sensors by which a relative position of the machining head in relation to the sensor or the sensors is sensed or calculated.

The workpiece is machined along the contour preferably by removing material, for example by ablation, cutting, milling or drilling, by changing material, such as for example by hardening or other changes of the microstructure or by bringing about a recrystallization of the material of the workpiece, or by welding or adhesive bonding. Mechanically acting machining means such as milling cutters, drills, saws or grinding means may be used for the machining.

Preferably, however, the machining is carried out by means of high-energy electromagnetic radiation, preferably by means of laser radiation. In a simple case, the contour may lie in one plane (machining plane), along which the workpiece or part of the workpiece is machined, for example cut off. In this case, for example, the machining head is guided in a plane around the workpiece and the latter is cut off along the line that is passed over by the machining head. The contour may also be of a complex configuration and, for example, have gaps and comprise arcs or other forms. For example, the machining of a workpiece held in a positioning device may take place along machining lines (a contour) of the workpiece.

Capacitive, optical and inductive methods may preferably be used as contactless measuring methods. By means of these measuring methods and by selective processing of the measuring signal, the distance between the workpiece surface and the machining head is measured. For simplicity, reference is made here to a distance of the machining head from the workpiece, although of course a distance between a sensor of the machining head and the workpiece is sensed. On the basis of the measuring results, a subsequent feedback control of the distance between the workpiece and the machining head is made possible. A sensor used for carrying out a measuring method is respectively assigned a sensor-specific measuring section. Measurements over distances within the measuring section produce reliable measured values. If, for example, a sensor is designed for distance measurements over distances of up to a maximum of 20 mm, its measuring section is 20 mm.

An alignment of the machining head and the workpiece in relation to one another and in relation to the contour may take place by a controlled change in the position of the machining head.

In a further design of the method according to the invention, the alignment of the machining head and the workpiece in relation to one another and in relation to the at least one contour may also take place by a controlled change in the position of the workpiece. The necessary distance correction between the machining head and the workpiece (alignment) may of course also be implemented by way of a change in the position of the positioning device. In this case, the machining head remains in its preprogrammed position and the workpiece is brought into the exact position in relation to the machining head by means of the positioning device.

It is also possible that the alignment of the machining head and the workpiece in relation to one another and in relation to the contour takes place by a controlled change in the position of the machining head and of the workpiece.

In the method according to the invention, a contactless sensing of an actual position takes place from at least two measuring positions at in each case at least one measuring point of the positioned workpiece. This means that steps C and D are carried out at least once at a different measuring position in each case. The deviations ascertained in step E are deviations of the distance values and in addition values derived from the distance values, such as for example an angular position of a virtual measuring axis that is imaginary and runs between the two measuring points.

By such a procedure, the angular position of the workpiece is derived from the two distance values at the two measuring positions and with knowledge of the measuring positions. Such a determination of the angular position of the workpiece is possible on a number of surfaces, so that the position of the workpiece in space (spatial position) can be derived at least for the regions of the workpiece that are used for the determination of the angular position.

For this purpose, it is favorable that the at least two measuring points lie on an imaginary measuring axis which runs through the surface of the workpiece and an angular position of the measuring axis with respect to a virtual reference axis is determined from the sensed actual positions. Such a reference axis may be, for example, an expected longitudinal axis of the workpiece. It is also possible that a reference axis is a virtual axis in a system of coordinates that is used for the determination of the spatial position of the machining head and/or of the workpiece.

In order to avoid a collision of the machining head with the workpiece, the method according to the invention may be designed such that the machining head is infed step by step to an infeeding position, which serves as a measuring position, in that the machining head is infed to a series of successive infeeding positions, at each infeeding position the presence of the workpiece within a measuring section is investigated by a distance measurement and, in the event of the workpiece not being present, the machining head is infed to a next infeeding position, the next infeeding position being chosen at a smaller distance from a previous infeeding position than the amount of the measuring section of the distance measurement. It is intended for these to be moved to as a sequence of infeeding positions. They are no further apart from one another than the length of the measuring section. This avoids a situation where the machining head at one infeeding position does not sense the presence of a workpiece but during the infeeding of the machining head to the next infeeding position there is a collision with the workpiece, which is located after the measuring section.

Two basic procedures are made possible by the method according to the invention.

The first procedure is that of carrying out at least one measurement before the beginning of the laser machining process. Before the beginning of the actual machining process, which is preferably a machining of the workpiece by means of laser radiation, the machining head is made to approach the workpiece to the machining position that is stored in a controller. It is expected that the workpiece is positioned in such a spatial position that a distance measurement by the machining head located at the measuring position is possible while keeping within the measuring section.

By way of at least one sensor of a distance sensor system of the machining head, the distance of the machining head from a point on the workpiece surface is sensed at the measuring position. If this sensed distance lies outside the prescribed tolerance, the machining head is moved toward the workpiece or away from it, for example by way of an infeeding movement along the z axis. Consequently, the machining head is in a starting position provided in relation to the workpiece. Subsequently, the process can be started, and for example a programmed contour machined by means of laser radiation.

The approaching and distance-measuring process may be carried out once or else a number of times from different directions. Measuring a number of times increases the reliability of the measurement and of the feedback control.

If a relatively great deviation of the actual position and the desired position is ascertained, apart from a lateral displacement of the workpiece there may in addition also be a skewing of the workpiece in the region of the machining plane. If this skewing, i.e. an angular deviation of the spatial position of the workpiece that is not within the tolerance, were not corrected and the workpiece were machined along the originally intended machining plane, the workpiece would merely be produced with poor quality or as a reject.

There would be an undesired angle, for example in a cut contour. This can be detected by distance measurements at further measuring positions respectively in relation to measuring points along the workpiece in various directions.

To avoid a collision of the machining head and the workpiece, the machining head may be made to approach the desired position step by step in a search run. If the measured distance is below a predefined value, i.e. there is the risk of a collision, either the entire machining process is stopped or, in a further design of the method according to the invention, only the infeeding of the machining head by the search run is stopped.

It is likewise possible, for the correction, to make the contour that is stored in a controller match the contour to be machined that is stored in the system of coordinates of a controller. This involves correcting the two contours mentioned by displacing the contours, or at least one frame that is assigned to one of the contours, in the corresponding direction. A frame is given by a number of coordinates of the system of coordinates.

If, in a further design of the method, a further measuring point is sensed at a further measuring position that is offset by 90°, a correction may also take place in a second direction.

Furthermore, in a second procedure, a control check is possible after the machining process. The distance sensor system integrated in the machining head can also be used for carrying out a control check with respect to the machining result. This is explained by way of example by the cutting off of portions of a pipe as a (starting) workpiece. A portion that has not been completely cut off remains in an undefined position on the workpiece. During the further processing, this remaining portion may disturb the production sequence or cause serious damage. It should therefore be endeavored to check after the completed machining process that there are no longer any incompletely cut-off portions on the workpiece.

The machining head is moved from the last position at which a machining of the workpiece by the machining head took place in the direction of the cut-off portion and the presence of material is checked by means of the distance sensor system. In the event of a negative measurement, that is to say no material has been found, the measurement can be repeated once again after the machining head is infed further to the machined contour. This ensures that even portions that are not completely cut off and remain in an unknown position on the workpiece can be detected. The readjustment of the machining head in accordance with available measuring results preferably takes place with the z axis of the machining head.

In order to check the success of a machining, once machining of the workpiece by the machining head has taken place, steps B, C, D and E may be carried out once again.

The two procedures may of course also be combined with one another and carried out one after the other.

In a further design, the method according to the invention may be extended in such a way that, in addition to a first workpiece in a first positioning device, at least one second workpiece is positioned in a second positioning device. Once steps C to E of the method according to the invention have been carried out for the first workpiece, steps C to E are carried out for the second workpiece. If the first workpiece and the second workpiece are in each case in such a spatial position that the respectively admissible tolerance value is maintained, the process continues with step F. If it is found in step E that the ascertained deviation values of at least one of the two workpieces lie outside the admissible tolerance values, step G is carried out for the workpiece concerned, or for both workpieces. Only when the first workpiece and the second workpiece are aligned such that the deviations of the two lie within the admissible tolerance values is the machining head infed to the contour.

In further designs of the method according to the invention, it is possible that a third workpiece or even a fourth workpiece is positioned in a third positioning device or a fourth positioning device, respectively, and steps C to E are carried out as described above.

The method according to the invention may be used particularly advantageously when operating an apparatus for machining non-rotationally symmetrical workpieces by means of laser radiation, since very high precision in the relative positioning of the machining head, the workpiece and the contour matters when using laser radiation.

The method may also be used in an apparatus for detecting and correcting a spatial position of a workpiece positioned in a positioning device by means of a machining head.

The object is also achieved by an apparatus for detecting and correcting a spatial position of a workpiece held in a positioning device by means of a machining head. An apparatus according to the invention has at least one positioning device for positioning a workpiece, at least one machining head having at least one distance sensor and means for sensing the position of the machining head and also a controller for changing the position of the machining head and/or of the workpiece in a controlled manner, the controller being configured such that the following steps take place as a result of action of the controller:

a. infeeding the machining head to at least one measuring position,
b. contactlessly sensing an actual position of a measuring point of the positioned workpiece at at least two measuring positions by using the machining head, the at least two measuring points lying on a virtual measuring axis which runs on a surface of the workpiece, and determining from the sensed actual positions an angular position of the virtual measuring axis with respect to a virtual reference axis,
c. comparing the sensed actual position with an expected desired position and ascertaining deviation values between the actual position and the desired position,
d. comparing the ascertained deviation values with an admissible tolerance value, the ascertained deviations being the deviations of the distance values between the actual position and the desired position and the angular position,
e. infeeding the machining head to (at least) one machining plane along which the workpiece is to be machined by the machining head whenever the ascertained deviation lies within the admissible tolerance value, or
f. aligning the machining head and the workpiece in relation to one another and in relation to the (at least) one machining plane in such a way that after the alignment a deviation of the actual position lies within the admissible tolerance values.

The machining head is provided with a distance sensor system. This comprises at least one sensor, which is suitable for distance measurement, preferably on the basis of a capacitive or inductive measuring principle. The distance measurement takes place over a sensor-specific measuring section. By means of this capacitive or inductive distance sensor system and by selective processing of the measuring signal, the distance between the workpiece surface and the machining head can be measured. By passing on the sensor signals to a controller designed for evaluating the sensor signals, the spatial positions of the workpiece and the machining head in relation to one another can be controlled. The readjustment of the machining head in accordance with available measuring results preferably takes place with the z axis of the machining head.

The machining head includes machining means for machining the at least one workpiece. The machining means may be mechanically acting means, such as for example milling cutters, bits, saws, drills, scrapers or planes. These may be interchangeable. It is preferred that the machining means is a high-energy electromagnetic radiation, preferably a laser radiation.

The machining head is preferably in connection with a laser source of the machining device and has devices for beam guidance and beam shaping. It is movable in a controlled manner by way of motors and a controller. In further embodiments of the apparatus according to the invention, the machining head may be movable by up to six degrees of freedom, specifically along the x, y and z axes of a Cartesian system of coordinates, and also rotatable about said axes. The machining head may therefore be rotatable and pivotable.

A positioning device may be any device that is suitable for holding a workpiece. Clamping devices may be, for example, clamping chucks, conical receptacles or other frictionally engaging and/or interlocking devices for holding workpieces. In further embodiments of the apparatus according to the invention, a number of positioning devices may be arranged. One or more positioning devices may be rotatable, i.e. a clamped-in workpiece is rotatable about at least one axis of the positioning device.

There is preferably a controller, by which at least the positioning device and the machining head can be activated. It is favorable if operating states of the positioning device and the machining head are made to match one another in order to ensure a consistently high precision of all the movements and method steps even over relatively long time periods during which the method is carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
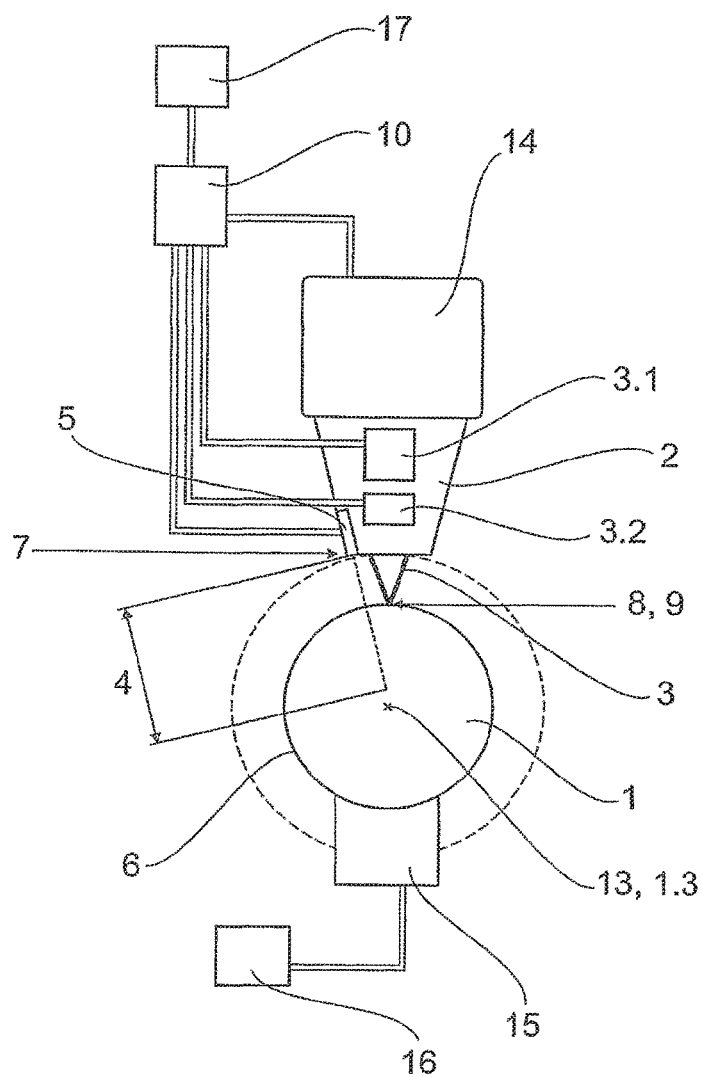
FIG. 1 shows a machining head at a measuring position and a workpiece at a desired position.

In FIG. 1 there is shown highly schematically a machining head 2, which has been infed to a measuring position 7. The machining head 2 has a sensor 5, which is a component part of a distance sensor system. The sensor 5 is designed to allow distance measurements on the basis of a capacitive measuring principle. The distance measurements can in this case take place reliably over the measuring section 4 (represented as a dashed line). The measuring section 4 is greater than a distance between the machining head 2 and the surface of a workpiece 1 to be machined. The workpiece 1 is positioned in a positioning device 15, which is in connection with a drive 16 and assumes such a spatial position that it is at an actual position 8 which corresponds to a desired position 9 of the workpiece 1. A focused laser beam can be generated by the machining head 2, by means of a radiation source 3.1 and a beam-shaping optical unit 3.2, and directed onto the workpiece 1. By means of the machining means 3, a machining of the workpiece 1 is possible at a contour 6. If the machining head 2 and the workpiece 1 are moved in relation to one another, a machining by means of the machining means 3 can take place along the contour 6. If the machining head 2 is guided around the workpiece 1 in the direction of the arrow, a machining, here a cutting of the workpiece 1, takes place along the contour 6. The apparatus comprises means for sensing the current position of the machining head 2 (position sensing means 17), by which a spatial position of the machining head 2 is known and made available to the controller 10.

A longitudinal axis 1.3 of the workpiece 1 coincides with a virtual reference axis 13. The sensor 5 is connected to a controller 10, which for its part is again connected in signaling terms to a drive 14 of the machining head 2. The movements of the machining head 2 are brought about by the drive 14. The radiation source 3.1 and the beam-shaping optical unit 3.2 are activated by the controller 10, whereby the provision of the laser beam and its focusing are influenced in a controlled manner. The drive 16 of the positioning device 15 is likewise activated by the controller 10.

Figure 2:
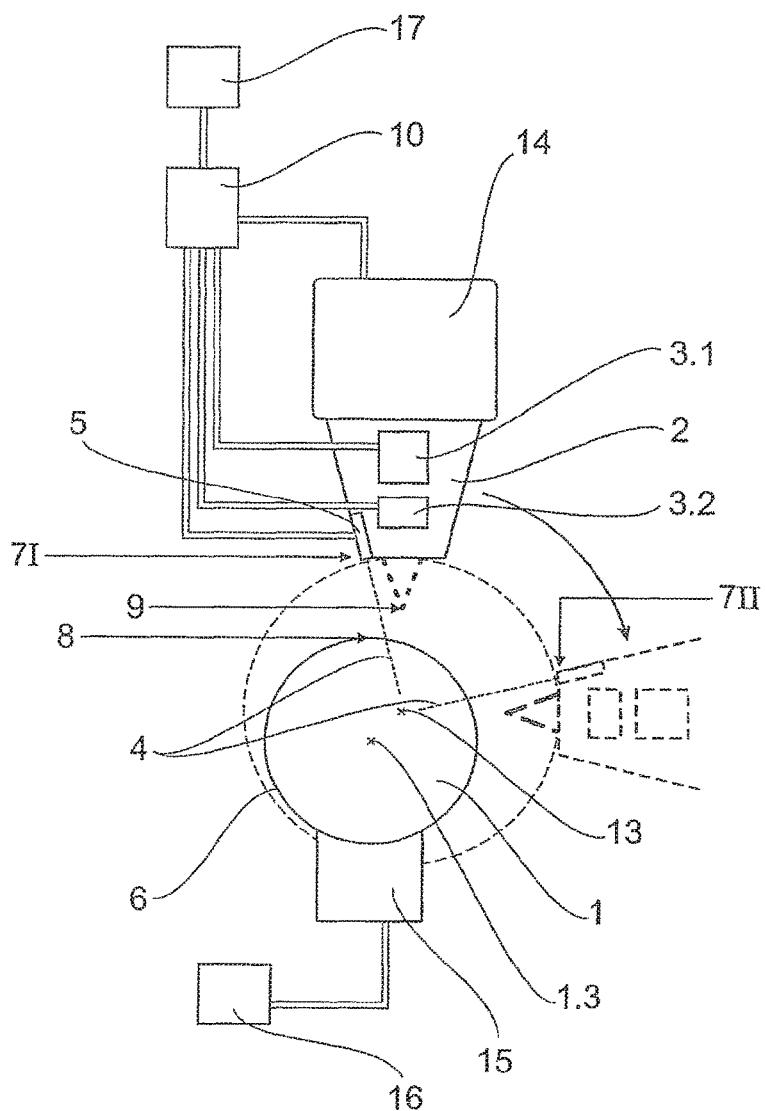
FIG. 2 shows a machining head at a measuring position and a workpiece away from the desired position.

FIG. 2 shows a setup similar to that in FIG. 1, but the workpiece 1 is at an actual position 8 which deviates from the desired position 9 in such a way that the deviation is greater than an admissible tolerance value. The machining head 2 has been infed to the first measuring position 7I. By means of the sensor 5, a distance measurement is carried out along the measuring section 4 and it is found that there is no workpiece 1 at the desired position 9. At the same time, the distance (distance value) of the one workpiece 1 from the sensor 5 is measured along the measuring section 4 (for simplicity with respect to a point on the surface of the workpiece 1) and is passed to the controller 10. The drive 14 is activated by the controller 10 and the machining head 2 is pivoted by 90° along the circumference of the workpiece 1 to a second measuring position 7II (machining head 2 shown by dashed lines). The radiation source 3.1 is switched off by the controller 10. The position of the machining head 2 at the second measuring position 7II is known by the position sensing means 17 and is available to the controller 10.

At the second measuring position 7II, a further distance measurement and sensing of the distance between the sensor 5 and the workpiece 1 take place. These results of the distance measurement are also sent to the controller 10. The spatial position of the workpiece 1 in the region of the first measuring position 7I and the second measuring position 7II can be determined from the known positions of the first measuring position 7I and the second measuring position 7II and also the associated distance values from the distance measurements. The determined spatial position of the workpiece 1 and the knowledge of the dimensions and form of the workpiece 1 allow the comparison of the spatial position of the longitudinal axis 1.3 with the known spatial position of a virtual reference axis 13. This virtual reference axis 13 corresponds to the expected spatial position of the longitudinal axis 1.3. The deviations of the spatial positions of the longitudinal axis 1.3 and the reference axis 13 that result from the comparison are used as corrective parameters for the correction of the spatial position of the workpiece 1. For this purpose, the drive 16 is activated by the controller 10 such that the workpiece 1 is displaced to its desired position 9. After this correction, a renewed distance measurement takes place. If the distance value determined here lies within the admissible tolerance, the radiation source 3.1, the beam-shaping optical unit 3.2 and the drive 14 are activated by the controller 10 and the workpiece 1 is machined by the laser beam as the machining means 3 along the contour 6.

In a modification of the method according to the invention, the spatial positions of the longitudinal axis 1.3 and the reference axis 13 are not compared with one another, but instead the spatial positions of the appropriate measuring points are used to produce the required control commands for the correction.

A further design of the method is that the workpiece 1 remains in its sensed spatial position and a virtual spatial system of coordinates (not shown) of the controller 10 is displaced such that the desired position 9 comes to lie with the determined actual position 8 within the admissible tolerance values. The drive 14 is then activated by the controller 10 such that at a measuring position 7 (not shown) the machining head 2 is aligned in relation with the workpiece 1 such that the admissible tolerance values are then maintained between the actual position 8 and the desired position 9.

Figure 3:
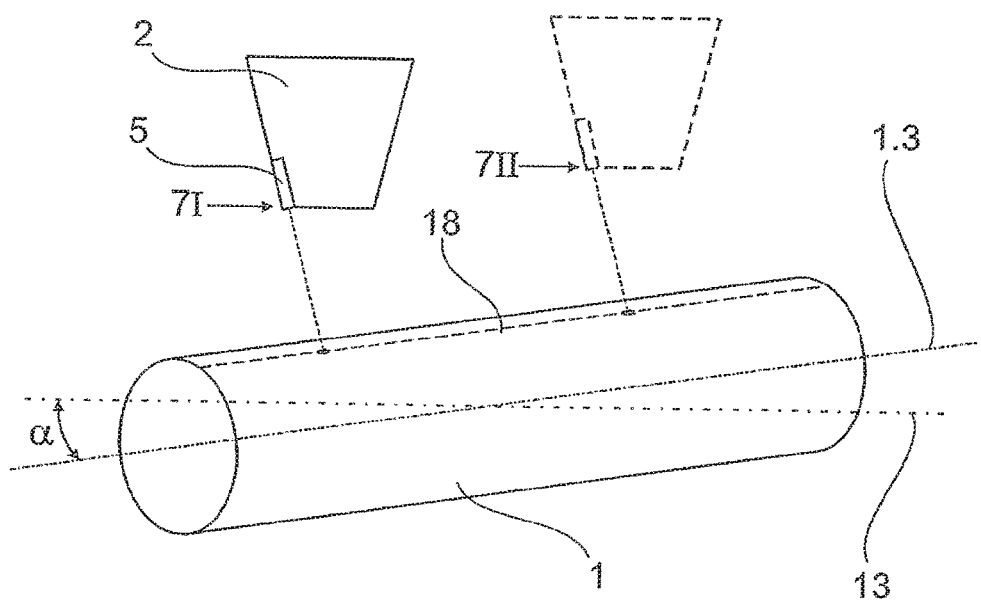
FIG. 3 shows a first exemplary embodiment of a distance measurement at a number of measuring positions along a measuring axis.

The procedure followed when skewed positions of a tubular workpiece 1 with a round cross section are found is shown in FIG. 3. In order to determine an angular position between the longitudinal axis 1.3 and the reference axis 13, a distance measurement between the machining head 2 and a point on the surface of the workpiece 1 is carried out, as described above, at a first measuring position 7I. Subsequently, the machining head 2 is moved a certain distance along a virtual measuring axis 18 of the workpiece 1 and a second distance measurement is carried out at a second measuring position 7II. The virtual measuring axis 18 runs in the longitudinal direction of the workpiece 1 along an (isoclinic) crest line of the curvature of the workpiece 1. An angular position of the workpiece 1 with respect to the reference axis 13 can be determined from the knowledge of the two measuring positions 7I and 7II and also the respectively sensed distance values. In order to make sure that distance values of points on the crest line are respectively used for the determination of the angular position at the two measuring positions 7I and 7II, distance measurements may be carried out a number of times at the two measuring positions 7I and 7II, the measuring positions 7 that are used thereby being varied orthogonally in relation to the longitudinal axis 1.3. The measuring position 7 with the smallest distance value is selected.

In a further design, the fundamental existence of an undesired angular position can be concluded if the distance measurements at the two measuring positions 7I and 7II give distance values that are not to be expected from a desired angular position.

It is also possible for distance measurements to take place at a number of measuring positions 7I to 7n (only 7I and 7II are shown). If the distance values thereby found give points of a curve instead of a straight line, the existence of an undesired angular position can be concluded.

Figure 4:
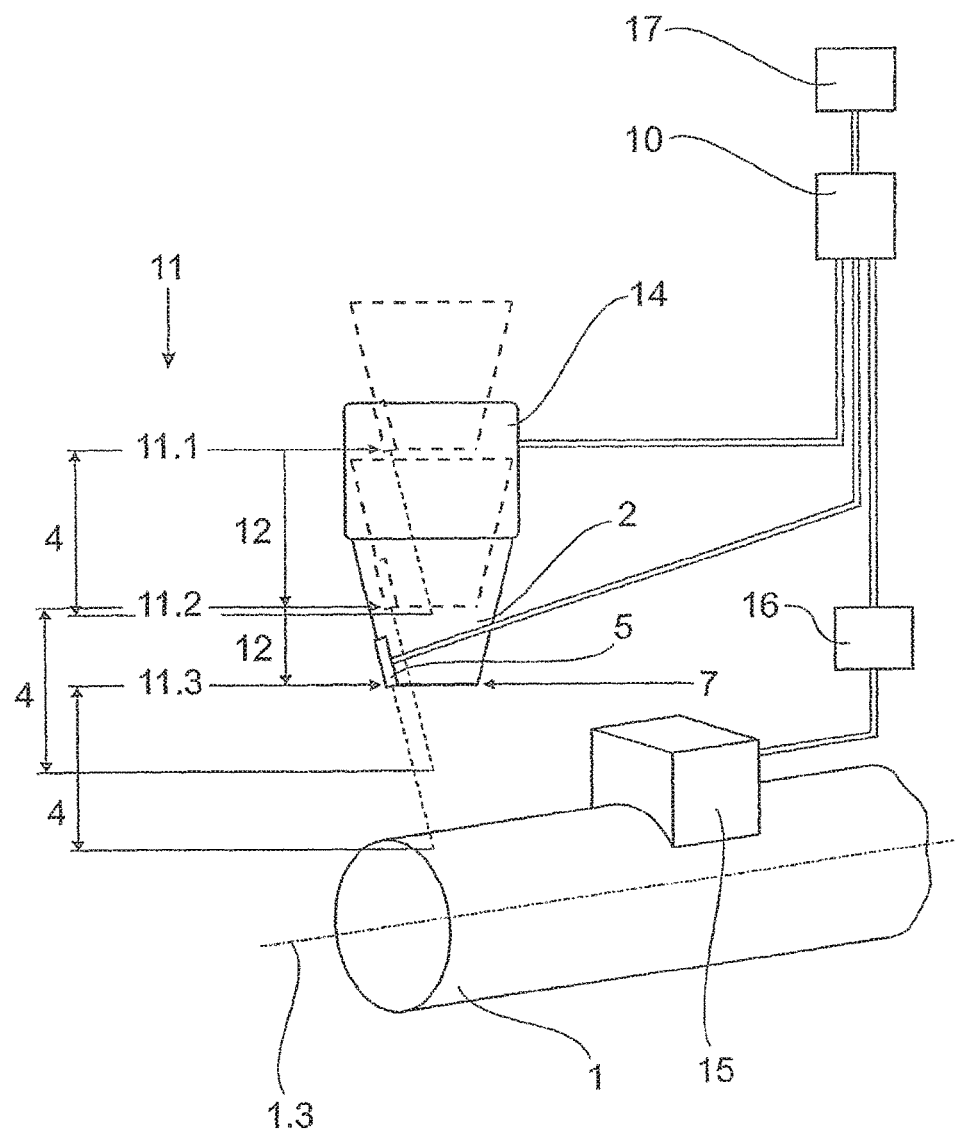
FIG. 4 shows a first exemplary embodiment of an apparatus according to the invention during a distance measurement after an infeed of the machining head to the measuring position along a number of infeeding positions and FIG. 5 shows a first exemplary embodiment of an apparatus according to the invention with two positioning devices.

A first exemplary embodiment of an apparatus according to the invention with a distance measurement after an infeed of the machining head 2 to the measuring position 7 along a number of infeeding positions 11 is represented in a simplified form in FIG. 4. In a first step, the machine head 2 is infed by the controller 10 and the drive 14 to a first infeeding position 11.1 and a distance measurement is carried out there along the measuring section 4. The workpiece 1 is not found to be present in this case. Then, the machine head 2 is infed in the direction of the measuring section 4 to a second infeeding position 11.2, the infeeding section 12 between the first infeeding position 11.1 and the second infeeding position 11.2 being shorter than the measuring section 4.

As a result, a collision of the machining head 2 with a workpiece 1 that is possibly present at the end of the measuring section 4 is avoided. At the second infeeding position 11.2, a distance measurement is in turn carried out. Again, the workpiece 1 is not found to be present along the measuring section 4 and after that the machining head 2 is infed to a third infeeding position 11.3. The infeeding section 12 is in turn smaller than the measuring section 4. At the third infeeding position 11.3, the presence of the workpiece 1 within the measuring section 4 is ascertained by the distance measurement taking place there. On the basis of the information concerning the spatial position of the machining head 2 and also the sensed distance value, the actual position 8 thus determined of the workpiece 1 is compared with an expected desired position 9. If it is found thereby that deviations between the actual position 8 and the desired position 9 are greater than admissible tolerance values, the drive 16 of the positioning device 15 is activated by the controller 10 and the positioning of the workpiece 1 is changed in a feedback-controlled manner such that the admissible tolerance values are maintained.

It is also possible, starting from the third infeeding position 11.3, to move the machining head 2 such that the admissible tolerance values are maintained.

This procedure, referred to as a search run, may also be used for the purpose of checking the presence of workpieces 1 or remains of material of which the spatial position is not known. The presence of incompletely cut-off workpieces 1 or of remains of material that remain on the workpiece 1 after the machining can also be checked, in that the presumed positions of the workpieces 1 or remains of material are moved to and checked by means of the search run.

Figure 5:
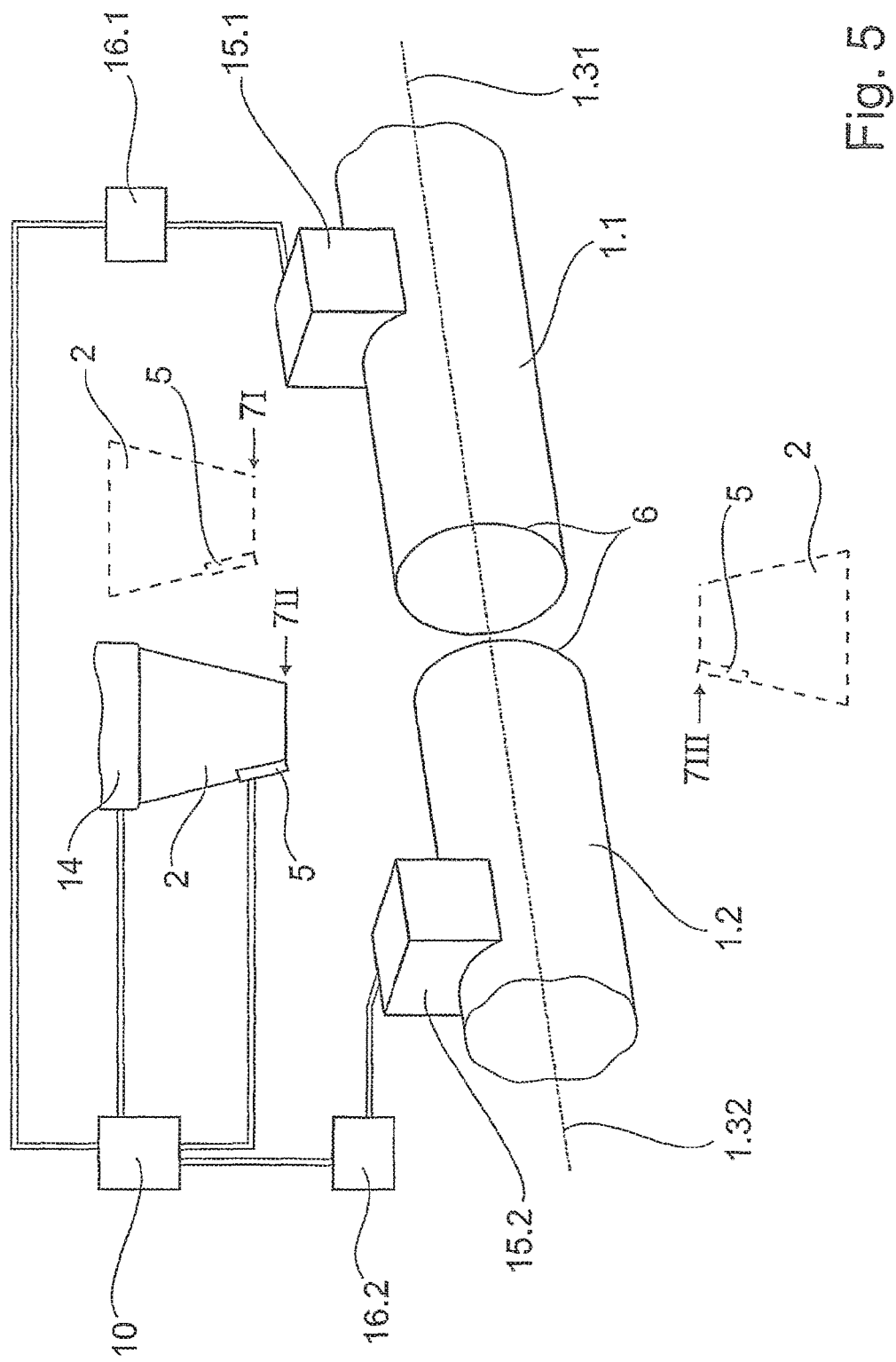

In FIG. 5, a first exemplary embodiment of an apparatus according to the invention with a first positioning device 15.1 and a second positioning device 15.2 is shown. In the first positioning device 15.1, a first workpiece 1.1 is positioned; in the second positioning device 15.2, a second workpiece 1.2 is positioned. The first positioning device 15.1 is assigned a first drive 16.1 and the second positioning device 15.2 is assigned a second drive 16.2. Both drives 16.1 and 16.2 are in connection with the controller 10. The spatial position of the first workpiece 1.1 is determined from the first measuring position 7I and, if need be, is corrected in the way stated above. The spatial position of the second workpiece 1.2 is determined from the second measuring position 7II and, if need be, is corrected. In FIG. 5, the first longitudinal axis 1.31 of the first workpiece 1.1 and the second longitudinal axis 1.32 of the second workpiece 1.2 are corrected in relation to one another so as to coincide.

Furthermore, the end faces of the two workpieces 1.1 and 1.2 are set against one another. The correct alignment of the two workpieces 1.1 and 1.2 is checked from a third measuring position 7III. From the third measuring position 7III, the two workpieces 1.1 and 1.2 are welded to one another by means of laser radiation. The weld seam is produced along the butt seam of the two workpieces 1.1 and 1.2, which serves as a contour 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting and correcting a spatial position of a workpiece held in a positioning device, the method comprising:
   positioning the workpiece in the positioning device;
   adjusting, via the positioning device, orientation and placement of the workpiece;
   partially infeeding a machining head, having at least one sensor for distance measurement and a position sensor detecting a current position of the machining head relative to at least two measured points on the workpiece;
   contactlessly sensing an actual position, via the at least two measured points, of the positioned workpiece at at least two measuring positions by using the at least one sensor of the machining head, the at least two measured points lying on a virtual measuring axis which runs along a surface of the workpiece, and determining from the sensed actual positions an angular position of the virtual measuring axis with respect to a virtual reference axis;
   comparing the sensed actual position with an expected desired position and ascertaining deviation values between the actual position and the expected desired position;
   comparing the ascertained deviation values with an admissible tolerance value, the ascertained deviations being at least a first deviation in distance values between the actual position and the desired position and a second deviation in the angular position;
   infeeding the machining head to a contour along which the workpiece is to be machined by the machining head when the ascertained deviation lies within the admissible tolerance value range; and
   when the ascertained deviation is not within the admissible tolerance value range, aligning the machining head and the workpiece in relation to one another and in relation to the one contour in such a way that after the alignment the first deviation of the actual position lies within the admissible tolerance value range.

2. The method as claimed in claim 1, wherein the alignment of the machining head and the workpiece in relation to one another and in relation to the one contour is performed by a controlled change in the position of the machining head.

3. The method as claimed in claim 1, wherein the alignment of the machining head and the workpiece in relation to one another and in relation to the one contour is performed by a controlled change in the position of the workpiece.

4. The method as claimed in claim 1, wherein the alignment of the machining head and the workpiece in relation to one another and in relation to the one contour is performed by a controlled change in the position of the machining head and the workpiece.

5. The method as claimed in claim 1, wherein the machining head is infed step by step to an infeeding position, which each serves as the at least two measuring positions, in that the machining head is infed to a series of successive infeeding positions, at each infeeding position the presence of the workpiece within a measuring section is investigated by a distance measurement, and wherein, in the event of the workpiece not being present, the machining head is infed to a next infeeding position, the next infeeding position being chosen at a smaller distance from a previous infeeding position than the length of the measuring section of the distance measurement.

6. The method as claimed in claim 1, wherein, once machining of the workpiece by the machining head is performed, said partial infeeding of the machining head, said contactless sensing, said comparing of the sensed actual position, and said comparing the ascertained deviation values are carried out once again in order to check the success of the machining.

7. The use of the method as claimed in claim 1 with an apparatus for machining non-rotationally symmetrical workpieces by means of laser radiation.

8. The use of the method as claimed in claim 1 in an apparatus for machining a workpiece positioned in a positioning device by means of a machining head.

9. The method as claimed in claim 1, wherein the sensed actual position is a three-dimensional position of the workpiece, and the method further comprises: pre-calculating a movement path for the machining head based on the sensed actual position before aligning the machining head.

10. The method as claimed in claim 1, wherein the angular position of the virtual measuring axis is the angular position of a surface of the workpiece, if the workpiece has a plurality of surfaces, the angular position of each of the plurality of surfaces can be calculated with measured points from two additional measuring positions of the at least two measuring positions.

11. The method as claimed in claim 1, wherein said partial infeeding of the machining head, said contactless sensing, said comparing of the sensed actual position, and said comparing the ascertained deviation values are repeated from different directions by the machining head for greater accuracy.

12. An apparatus for detecting and correcting a spatial position of a workpiece held in a positioning device by a machining head having at least one first positioning device for positioning a first workpiece, the positioning device adjusting orientation and placement of the workpiece, at least one machining head having at least one sensor for distance measurement and position sensing device sensing a current position of the at least one machining head and also a controller for changing the current position of the at least one machining head and/or of the workpiece in a controlled manner, the controller being configured such that the following steps take place as a result of action of the controller:

partially infeeding the at least one machining head to at least two measuring positions;

adjusting, via the positioning device, orientation and placement of the workpiece;

contactlessly sensing an actual position, via a measured point on the workpiece, of the positioned workpiece at the at least two measuring positions by using the at least one sensor of the at least one machining head, the at least two measured points lying on a virtual measuring axis which runs along a surface of the workpiece, and determining from the sensed actual positions, an angular position of the virtual measuring axis with respect to a virtual reference axis;

comparing the sensed actual position with an expected desired position and ascertaining deviation values between the actual position and the expected desired position;

comparing the ascertained deviation values with an admissible tolerance value, the ascertained deviations being a first deviation in distance values between the actual position and the desired position and a second deviation in the angular position, infeeding the machining head to a contour along which the workpiece is to be machined by the machining head when the ascertained deviation lies within a range of admissible tolerance values; and when the ascertained deviation is not within the range of admissible tolerance values, aligning the machining head and the workpiece in relation to one another and in relation to the one contour in such a way that after the alignment the first deviation of the actual position lies within the range of admissible tolerance values.

* * * * *